United States Patent [19]

Krippl et al.

[11] Patent Number: 4,931,480
[45] Date of Patent: Jun. 5, 1990

[54] PROCESS FOR THE PREPARATION OF POLYURETHANE FOAMS

[75] Inventors: Kurt Krippl, Monheim; Klaus Schulte; Erwin Hoffmann, both of Leverkusen; Rolf Wiedermann, Odenthal, all of Fed. Rep. of Germany

[73] Assignee: Bayer Aktiengesellschaft, Leverkusen, Fed. Rep. of Germany

[21] Appl. No.: 316,378

[22] Filed: Feb. 27, 1989

[30] Foreign Application Priority Data

Mar. 11, 1988 [DE] Fed. Rep. of Germany ....... 3808081

[51] Int. Cl.$^5$ .............................................. C08G 18/14
[52] U.S. Cl. ...................................... 521/99; 521/128; 521/131; 521/155
[58] Field of Search .................. 521/99, 128, 155, 131

[56] References Cited

U.S. PATENT DOCUMENTS 4,764,536  8/1988  Proksa et al. ...................... 521/131

Primary Examiner—Maurice J. Welsh
Attorney, Agent, or Firm—Joseph C. Gil

[57] ABSTRACT

This invention relates to a process for the preparation of polyurethane foams by the reaction of a foamable reaction mixture. A liquid blowing agent is added to either the isocyanate or the polyol prior to mixing of the components. An inert gas is dispersed in the component which contains the blowing agent and the gas charged component is immediately and continuously mixed with the other component, at the same time keeping it at least under the pressure required for charging it with gas until mixing has been completed, and leaving the resulting reaction mixture to foam up. The key to the present invention is in the small amount of gas charging.

4 Claims, No Drawings

PROCESS FOR THE PREPARATION OF POLYURETHANE FOAMS

BACKGROUND OF THE INVENTION

The present invention is broadly directed to a process for preparing a polyurethane foam. Blowing agents are used in the preparation of such foams for obtaining the required gross density. In addition, chlorofluoroalkanes used as blowing agents in the preparation of insulating foams improve the heat insulating properties of such foams. Charging at least one of the reactants with gas serves to form centers of nucleation for starting the foaming reaction. It has been found difficult to keep the readily volatile, liquid blowing agents in the component or reaction mixture to which it has been added. Considerable quantities of blowing agent are lost in the conventional method of injection mixing due to the sudden change from the injection pressure to the pressure in the mixing chamber. Further quantities of blowing agent are lost when the reaction mixture leaves the mixing chamber due to the reduction to atmospheric pressure. All blowing agent so lost is no longer available for the formation of foam. Thus in order to obtain the required density, it has generally been necessary to utilize higher quantities of blowing agent than would theoretically be necessary if no blowing agent were lost.

The problem arises of providing a process which enables the quantity of blowing agent used to be reduced while preserving the advantageous physical properties of the foam obtained as end product by ensuring that the blowing agent added is utilized as completely as possible for its intended purpose, namely adjustment of the product to the desired gross density and in some cases improvement in the heat insulating properties.

DESCRIPTION OF THE INVENTION

The above problem is solved by charging the reaction component(s) containing the blowing agent with at most 10 vol.-% of gas, the gas being so finely dispersed that the gas bubbles obtained have an average size of at most 1.5 mm, and preferably not more than 1.0 mm. The volume percent charged is based on a gas at 22° C. at normal pressure (i.e., 1.031 bars).

In practice, gassing would not be carried out at normal pressure, pressures of about 2 to 8 bar, (and especially in the region of 4 bar) being normally preferred. If the room in which the process is carried out is not air conditioned at temperatures in the region of 22° C., the results may also be influenced by considerable temperature fluctuations, depending on the time of year. If the actual temperatures of the gassed component, and in particular of the gas, and the gassing pressure deviate significantly from the above-mentioned reference values, then the actual maximum gas charge which is permissible for the purpose of this invention may be determined by the gas equation $pV=RT$. The actual maximum permissible size of gas bubbles can also be calculated from the gas equation and the volumetric formula (volume of sphere). Temperatures above 22° C. increase the volume of gas above that obtained at the above-mentioned reference temperature, while pressures above normal pressure reduce the volume. In these calculations, the liquid reaction components are to be regarded as incompressible. The effective gas content may be determined, for example, from the density of the component(s) which is (are) charged with gas, taking into account the temperature and pressure. To determine the average size of gas bubbles at the actual pressure and temperature, the stream of gas-charged component(s) may be passed, for example, through a transparent, preferably rectangular tube and photographed. The photograph is then enlarged if necessary and the number of bubbles per unit surface area is determined as well as the number of bubbles having the same diameter or lying within approximately the same range of diameters, taking into account the scale of magnification of the photograph. The average bubble size is calculated from the results. In practice, this only requires an initial effort since as a general rule only a small number of chemical systems are processed and in most cases under repetitive conditions. The actual, maximum gas charge and size of bubbles permitted for the various temperatures and pressures for the purpose of this invention may then be recorded in graphs or tables for repeated use to obviate repeated calculations and determinations. If an accurately operating gas charging device is used, then again repeated determination of the bubble size is unnecessary once a suitable calibrating curve has been recorded for operating the gas charging device.

Suitable gas charging devices include those described in published European patent application No. 0,175,252 and German Offenlegungsschrift No. 3,434,443. One particularly preferred device is disclosed in German application No. 3,808,082.6, which corresponds to U.S. application Ser. No. 07/316,381, filed on Feb. 27, 1989. This device for charging at least one liquid reactant with gas is based on a gassing tank which is to be attached to a conduit leading from a storage tank to a mixing head. The gassing tank is equipped with a hollow stirrer which has an intake opening in the upper region within the gassing tank and stirrer blades with gas outlet openings in the lower region of the gassing tank. A gas supply pipe opens into the upper region of the gassing tank. The gassing tank has a filling level regulator for controlling the liquid level of the reactant, which regulator is associated with an activator drive of a shut off valve in the gas supply duct by way of a pulse lead. The opening of the feed pipe for the as yet ungassed reactant is situated just below the liquid level of the reactant. The outlet opening into the discharge duct for the reactant charged with gas is situated below the stirrer blades. Density measuring instruments are arranged both in the inlet pipe and in the discharge pipe, which measuring instruments are connected by pulse leads to a computer and control apparatus which in turn is connected to the speed adjustable drive of the hollow stirrer by a pulse lead.

The filling level regulator serves to replace the spent gas while the rate of inflow of ungassed reactant remains substantially constant. The opening of the inlet pipe at a level just below the liquid level ensures that the uppermost layer is constantly replaced. Since the opening into the discharge pipe for gassed reactant is situated below the hollow stirrer, preferably centrally in the base of the container, the gassed reactant can no longer come into contact with the gas cushion and optimum flow conditions are obtained. The density measuring instruments in the inflow duct and outflow duct enable the changes in density due to gassing to be determined and allow for the measurement of the effective gas content of the charged reactant after the gassing process. The computer and control apparatus enables the measured values to be compared with the required values, taking into account the initial conditions of density, temperature and pressure. If these initial values fluctuate in the course of the operation to an extent which is not negligible, the computer and control apparatus transmits a command to the drive of the hollow stirrer by way of the speed regulator to vary the speed of rotation as required so that the effective gas content will be kept constant.

A temperature measuring instrument connected to the computer and control apparatus by a pulse lead is also preferably provided. A pressure measuring instrument connected to the computer and control apparatus by a pulse lead is also preferably provided. Any changes in the operating temperature and pressure large enough to significantly affect the density and hence the gas content can thereby be taken into account by a variation in the speed of rotation.

According to one particular embodiment of the apparatus, the interface between the gas cushion and the region in which the component is situated is smaller than the cross sectional area of the region of the component at the level of the stirrer blades of the hollow stirrer. Diffusion between the gas cushion and the reactant is thereby almost completely eliminated. This reduction in the interface area may advantageously be obtained by using a floating lid covering the major part of the interface.

According to another embodiment producing the same effect, the gassing tank has a smaller diameter in the region of the liquid level than in the region of the stirrer blades of the hollow stirrer.

According to yet another embodiment, the stirrer shaft is covered in the region of the reactant by a sleeve fixed to the internal surface of the gassing tank. This sleeve prevents the formation of a funnel.

The filling level regulator preferably has two limiting value controls. The liquid level is kept constant between these limiting value controls which operate within a narrow interval.

Another embodiment is characterized in that the opening of the inlet pipe is in the form of a wide mouth. This results in a laminar, flat inflow which spreads out over the cross section of the gassing tank and continuously renews the uppermost layer of reactant so that a narrow range of residence times is ensured precisely in the region which is critical for avoiding diffusion. According to a variation of this embodiment, the opening of the supply duct consists of several openings distributed over the circumference of the gassing tank. If a sufficient number of such openings is provided, preferably distributed uniformly over the circumference, a flow in the radial direction towards the stirrer shaft is achieved before it dips down.

Another variation of the opening of the inflow duct consists of an annular distributor channel with overflow. Here again, a flow directed radially to the stirrer shaft is obtained due to the arrangement of the distributor channel on the internal circumference of the tank.

If further processing of the gas charged component is carried out continuously, as for example in the production of foam or the production of foam panels on double conveyor belts, the gassed component is continuously supplied to the mixing head by means of the dosing pump. In the case of an intermittent process, as for example when molds have to be filled, a small storage tank for the gassed reactant is arranged between the gassing tank and the mixing head, as already proposed in German Offenlegungsschrift No. 3,434,443. The gassed reactant in the storage tank may if necessary be circulated through the mixing head or through reversing valves upstream of the mixing head during periods of rest. When foam molding installations are operated in time with the gassing installation, optimum operating conditions are obtained if the consumption of gassed component, viewed over the whole operating time, is equal to the quantity of gassed component supplied to the storage container, since in that case the gassing tank may be operated continuously.

It has to date been the practice to employ the highest possible gas charges for reaction injection molding, typically in the range of from about 20 to 70 vol.-%, based on the total volume of the gassed components. For the production of foams of relatively high gross density, this high gas charge was used to combine the improved expansion of the reaction mixture with the advantage of producing an internal pressure in the mold for obtaining better surface properties. For the production of foams of low gross density, e.g., below 100 kg/m$^3$, a large amount of liquid blowing agent was necessary to obtain the desired gross density. In these systems, it was not customary to introduce a controlled amount of a gaseous substance into one of the reactants.

It was completely surprising to find that minute quantities of gas in a very finely dispersed form save up to about 20% of the liquid blowing agent. This phenomenon may be explained on the basis that when relatively large quantities of blowing agent are introduced, bubbles of relatively large average diameter are inevitably produced. These large bubbles accumulate blowing agent and burst when the foam is processed. This results in pitting and in the release of blowing agent into the atmosphere. This is not likely to occur when small quantities of gas are dispersed in a very fine form when following the present invention. The blowing agent in this case adheres to the gas component and is thereby optimally held and distributed. Other advantageous effects of the present invention include the fine cell structure obtained, which considerably improves the shrinkage properties; the contour stability of the cells and other physical properties, e.g. the compressive strength.

It is surprisingly found that the low gas charge renders the chemical system more active and therefore also results in a saving in activator (or catalyst). It is, however, necessary to ensure that the gas charged component(s) is (are) introduced into the apparatus for mixing the reactants as directly as possible and without delay. There should be no interim storage so that the small bubbles cannot unite to form larger bubbles. Furthermore, there must not be any interim release of pressure from the time of gassing to the moment of mixing of the reactants as this would cause an increase in size and fusion of the bubbles.

The preparation of foams containing urethane groups is known per se. Typically such foams are produced from isocyanates, polyols, blowing agents, and various other materials. The gas may be charged to either the polyol, the isocyanate or both.

The isocyanates which can be used for the preparation of polyurethane foams include aliphatic, cycloaliphatic, aromatic and heterocyclic polyisocyanates as described, for example, by W. Siefken in Justus Liebigs Annalen der Chemie, 562, pages 75 to 136. Specific examples include those of the following formula:

$$Q(NCO)_n$$

in which n=2 to 4, preferably 2 to 3, and

Q represents an aliphatic hydrocarbon group containing 2 to 18, and preferably 6 to 10 carbon atoms, a cycloaliphatic hydrocarbon group containing 4 to 15, and preferably 5 to 10 carbon atoms, an aromatic hydrocarbon group containing 6 to 15, and preferably 6 to 13 carbon atoms or an araliphatic hydrocarbon group containing 8 to 15, and preferably 8 to 13 carbon atoms.

Suitable specific polyisocyanates are also described on pages 10 to 11 of German Offenlegungsschrift No. 2,832,253. Commercially readily available polyisocyanates are generally particularly preferred. Such isocyanates include, e.g., 2,4- and 2,6-tolylene diisocyanate and mixtures of these isomers ("TDI"); polyphenyl polymethylene polyisocyanates of the kind obtained by aniline/formaldehyde condensation followed by phosgenation ("crude MDI"); and polyisocyanates containing carbodiimide groups, urethane groups, allophanate groups, isocyanurate groups, urea groups or biuret groups ("modified polyisocyanates"), especially those modified polyisocyanates which are derived from 2,4- and/or 2,6-tolylene diisocyanate or from 4,4'- and/or 2,4'-diphenylmethane diisocyanate.

Useful polyols include those with molecular weights of from 350 to 10,000. Preferred are polyethers or polyesters containing at least two hydroxyl groups. Polyethers and polyesters of this type are known per se for the production of cellular polyurethanes and have been described, e.g. in German Offenlegungsschrift No. 2,832,253, pages 11 to 18.

Useful blowing agents include liquid blowing agents such as chlorofluoroalkanes, and in particular monofluorotrichloromethane, difluorodichloromethane or 1,2-difluoro-1,1,2,2-tetrachloroethane and methylene chloride. Other, less conventional blowing agents, such as nitroalkanes, nitroureas, aldoximes, amides, active $CH_2$ compounds and boric acid, provided they are obtainable or can be introduced in a liquid form (see Kunststoff-Handbuch Polyurethane, Volume VII, 2nd Edition, 1983, publishers Carl-Hanser-Verlag, Munich/Vienna, in particular pages 103 and 104) are also useful.

Various other additives and materials can be used. Such additives and materials include:

(a) compounds with molecular weights of from 32 to 349 and containing at least two isocyanate reactive hydrogen atoms. These include compounds containing hydroxyl groups and/or amino groups and/or thiol groups and/or carboxyl groups, and preferably hydroxyl groups and/or amino groups. These compounds are used as chain lengthening agents or cross-linking agents. These compounds generally contain from 2 to 8, preferably from 2 to 4 isocyanate reactive hydrogen atoms. Examples are described in German Offenlegungsschrift No. 2,832,253, pages 19 to 20;

(b) catalysts of known type, generally used in quantities of up to 10% by weight, based on the quantities of polyols used;

(c) surface-active additives such as emulsifiers and foam stabilizers;

(d) reaction retarders, e.g. substances which are acid in reaction such as hydrochloric acid or organic acid halides; cell regulators of known types such as paraffins or fatty alcohols or dimethylpolysiloxanes; pigments; dyes; and known types of flame retardants such as tris-chloroethyl phosphate, and tricresyl phosphate; stabilizers against ageing and weathering; plasticizers; fungistatic and bacteriostatic substances; and fillers such as barium sulphate, kieselguhr, carbon black or whiting.

These optionally used auxiliary agents and additives are described, for example, in German Offenlegungsschrift No. 2,732,292, pages 21 to 24. Further examples of optional additives, including surface-active additives, foam stabilizers, cell regulators, reaction retarders, stabilizers, flame retardants, plasticizers, dyes and fillers and fungistatic and bacteriostatic substances and details concerning the use and mode of action of these additives are described in Kunststoff-Handbuch, Volume VII, published by Vieweg and Höchtlen, Carl-Hanser-Verlag, Munich 1966, e.g. on pages 103 to 113.

The foams produced according to the invention are prepared by art recognized techniques. For example, the components can be reacted together by the known one-shot process, the prepolymer process or the semi-prepolymer process, in many cases using mechanical devices such as those described, for example, in U.S. Pat. No. 2,764,565. Details concerning processing apparatus suitable for the purpose of the invention are also described in Kunststoff-Handbuch, Volume VII, published by Vieweg and Höchtlen, Carl-Hanser-Verlag, Munich 1966, e.g. on pages 121 to 205.

According to one particularly preferred embodiment, the maximum gas charge is 5 vol.-%. It has been found that optimum results may be obtained with gas charges below 5 vol.-%, especially in the region of 2 to 3 vol.-%. The gas used is preferably an inert gas such as air, carbon dioxide, nitrogen or a noble gas, in particular argon. The use of these gases is not in itself new but they have been added in much larger quantities, as described above, namely from 20 to 70 vol.-%.

The invention is further illustrated, but is not intended to be limited by the following examples in which all parts and percentages are by weight unless otherwise specified.

EXAMPLES

Foams in the form of rigid foam boards were produced on a laminator, using a high pressure foaming machine, comprising a gas charging device as disclosed in German patent application No. 3,808,082.6, which corresponds to U.S. application Ser. No. 07/316,381, filed on Feb. 27, 1989. The boards had a thickness of 40 mm.

The polyol mixture used had the following composition:

30 Parts by weight of a tolylene diamine initiated polyether containing ethylene oxide and propylene oxide (weight ratio 1:1) and having a hydroxyl number of 470, 15 parts by weight of an ethylene diamine initiated propylene oxide polyether with a hydroxyl number of 630, 35 parts by weight of a sucrose initiated propylene oxide polyether with a hydroxyl number of 420, 7 parts by weight of glycerol, and 14 parts by weight of trichloroethylphosphate. The hydroxyl number of the mixture was 510.

The foaming conditions, other raw materials and results are given in the following Table. Examples 2, 4, 5 and 6 are obtained according to the process of the invention, while Examples 1 and 3 are comparison examples.

|  | EXAMPLES | | | | | |
| --- | --- | --- | --- | --- | --- | --- |
|  | 1 | 2 | 3 | 4 | 5 | 6 |
| Polyol mixture (parts by weight) | 100 | 100 | 100 | 100 | 100 | 100 |
| Water (parts by weight) | 0.6 | 0.6 | 0.6 | 0.6 | 0.6 | 0.6 |
| Silicone stabilizer B 8404 of Goldschmidt, Essen BRD (parts by weight) | 1.5 | 1.5 | 1.5 | 1.5 | 1.5 | 1.5 |
| Polymeric diphenylmethane diisocyanate containing 50% of 2,4'-or 4,4'-diphenylmethane diisocyanate (parts by weight) | 150 | 150 | 150 | 150 | 150 | 150 |
| Isocyanate Index | 105 | 105 | 105 | 105 | 105 | 105 |
| Thickness of board (mm) | 40 | 40 | 40 | 40 | 40 | 40 |
| Activator: Dimethylcyclohexylamine (parts by weight) | 1.5 | 1.5 | 1.5 | 1.5 | 1.5 | 1.0 |
| Liquid blowing agent: Trichlorofluoromethane (parts by weight) | 40 | 35 | 35 | 35 | 32 | 32 |
| Gassing conditions: | | | | | | |
| Temperature (°C.) | 20 | 20 | 20 | 20 | 20 | 20 |
| Pressure (bar) | 4 | 4 | 4 | 4 | 4 | 4 |
| Air: Calculated value in vol.-% at 22° C. and normal pressure | — | 6 | 20 | — | — | — |
| Average bubble diameter (mm) at 22° C. and normal pressure | — | 0.8 | 2.5 | — | — | — |
| $CO_2$: Calculated value in vol.-% at 22° C. and normal pressure | — | — | — | — | 3 | 3 |
| Average bubble diameter (mm) at 22° C. and normal pressure | — | — | — | — | 0.8 | 0.8 |
| Argon: average value in vol.-% at 22° C. and normal pressure | — | — | — | 4 | — | — |
| Average bubble diameter (mm) at 22° C. and normal pressure | — | — | — | 0.6 | — | — |
| Gross density ($kg/m^3$) | 32.5 | 33.0 | 36.0 | 32.5 | 32.9 | 33.5 |
| Gel time (sec) | 30 | 23 | 23 | 21 | 22 | 30 |
| Cell structure Average cell diameter (mm) | 2.5 | 0.7 | 1.8 | 0.5 | 0.9 | 0.9 |
| Thermal conductivity Watt/m.k | 0.0175 | 0.0175 | 0.0180 | 0.0175 | 0.0185 | 0.0185 |
| Compressive strength $N/mm^2$ | 0.17 | 0.18 | 0.19 | 0.19 | 0.18 | 0.19 |
| Contour stability 5 hours at 80° C. (% length, width, height) | 0.6 | 0.6 | 0.6 | 0.6 | 0.6 | 0.6 |

What is claimed is:

1. In a process for the preparation of polyurethane foams by reaction of a foamable reaction mixture of (a) one or more organic polyisocyanates, (b) one or more polyols with molecular weights of from 350 to 10,000, (c) one or more liquid blowing agents and, optionally, (d) other additives, by first adding the liquid blowing agent to component (a) and/or (b) and in addition dispersing an inert gas in the component, immediately and continuously transferring this component to the process of mixing with the other component and at the same time keeping the gas-containing component at least under the pressure at which gas charging takes place until the component is mixed, and leaving the reaction mixture obtained to foam up, the improvement wherein the component (a) and/or (b) which contains a blowing agent, is charged with no more than 10 volume % of gas, the gas being so finely dispersed in the components that the maximum average size of gas bubbles obtained is 1.5 mm, said volume percent being based on a gas at 22° C. and normal atmospheric pressure.

2. The process of claim 1, characterized in that the component containing blowing agent is charged with no more than 5 volume % of gas.

3. The process of claim 1, characterized in that the average bubble size is adjusted to a maximum of 1 mm.

4. The process of claim 1, characterized in that the gases used are inert gases, air, carbon dioxide, nitrogen or noble gases.

* * * * *